Jan. 16, 1968 W. E. COLLINS 3,363,620
CALORIC IRRIGATION RECEPTACLE FOR TESTING THE
VESTIBULAR SYSTEM IN THE INNER EAR
Filed Oct. 12, 1965
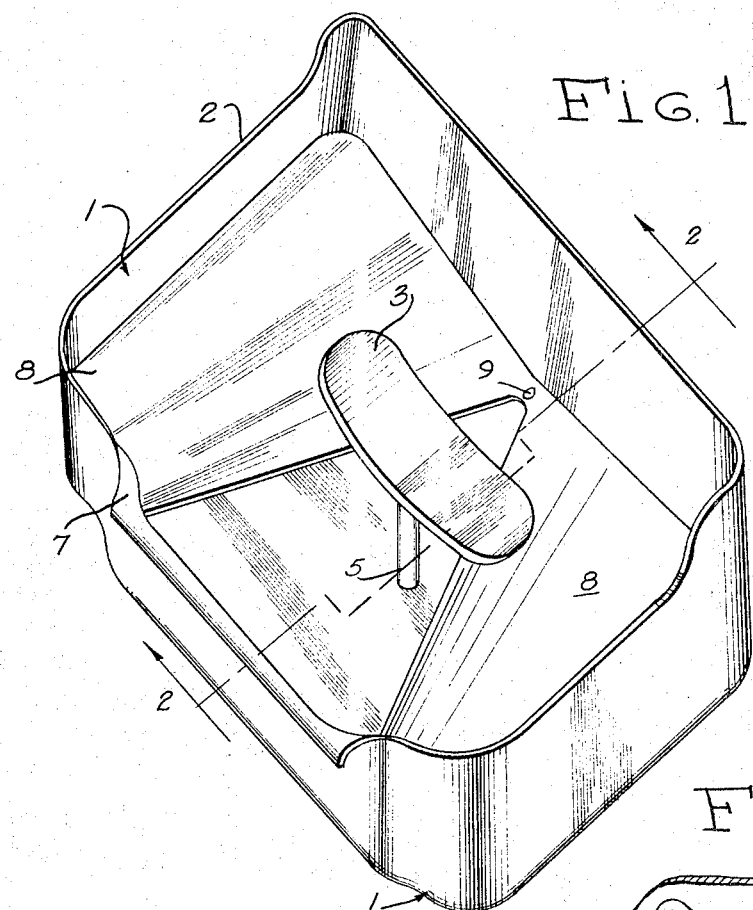
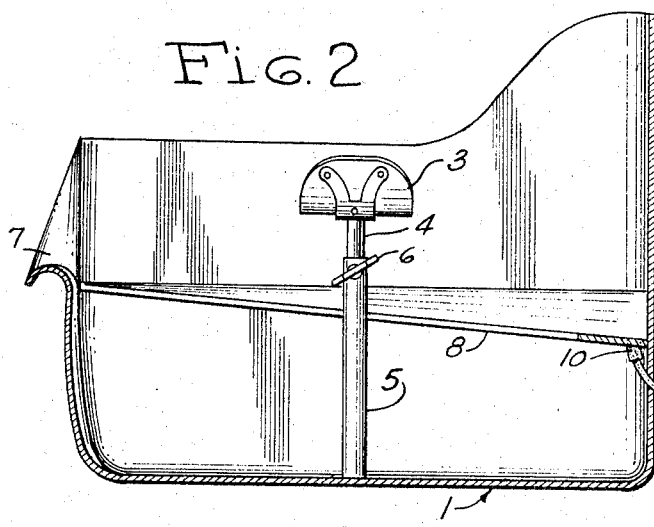
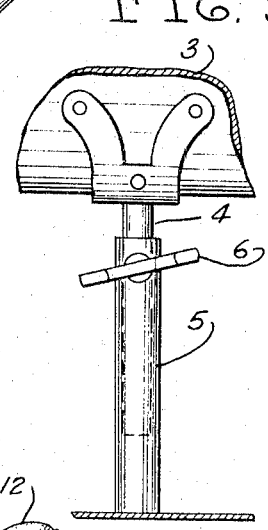
INVENTOR.
WILLIAM E. COLLINS
BY
*William G. Gapcynski*
ATTORNEY

United States Patent Office 3,363,620
Patented Jan. 16, 1968

3,363,620
CALORIC IRRIGATION RECEPTACLE FOR TESTING THE VESTIBULAR SYSTEM IN THE INNER EAR
William E. Collins, Oklahoma City, Okla., assignor to the United States of America as represented by the Secretary of the Army and/or the Administrator of the Federal Aviation Agency
Filed Oct. 12, 1965, Ser. No. 495,361
6 Claims. (Cl. 128—2)

The invention described herein may be manufactured and used by or for the Government for governmental purposes without the payment to me of any royalty thereon.

This invention relates to fluid receptacles and more particularly to a caloric irrigation receptacle equipped with a headrest, and designed to receive the return flow of fluid during irrigation of the ear or ears.

Caloric irrigations of the ear may be performed in the clinic or under experimental laboratory conditions as a means of testing the integrity of the vestibular system located in the inner ear. Stimulation of the vestibular system, according to the widely accepted Fitzgerald-Hallpike technique is accomplished by placing the patient in a supine position on a bed or examining table, elevating the head on a 30 degree angle, and introducing water at a controlled rate into the ear or ears.

Water is introduced through a tube from a container or syringe at a controlled rate of flow of from 2 cubic centimeters per second to 15 cubic centimeters per second for 40 seconds. The water is introduced at either 30° C. or 44° C., 7° above or below body temperature.

The introduction of water into the ear canal causes either a warming or a cooling of the inner ear which in turn causes a flow of fluid within the semicircular canals of the vestibular system producing a patterned eye movement response and a feeling of vertigo, in the patient, which are observed or recorded by electrophysiological means by the physician or scientist, and evaluated.

Previously, collecting the return flow of water from the ear necessitated either the patient-subject or an assistant holding a basin or a similar container to catch the flow during irrigation. Startle effects caused by the irrigation or improper positioning of the container often led to spilling the water on the patient, bedding, or surrounding apparatus.

Accordingly, it is an object of this invention to provide a stable container, incorporating a headrest, designed to insure that the head of the patient is maintained at the proper angle throughout irrigation and positioned thereover for efficient collection of the return flow in ear irrigation.

It is another object to provide a simple container which will simultaneously position the head and catch the return flow during ear irrigation thereby allowing efficient operation of the simulation-recording technique in a darkened room.

It is further an object to provide a collection container with a positioned headrest which will insure that the proper head angle is maintained and that the return flow is collected when either one or both ears of a patient are irrigated simultaneously.

These and other objects of the invention will be obvious from the following description with reference to the accompanying drawings wherein:

FIG. 1 is a perspective top view of the device;
FIG. 2 is a sectional view of FIG. 1 along line 2—2; and
FIG. 3 is an enlarged detail view of a portion of the device shown in FIG. 2.

Referring to the drawings which are illustrative of a preferred embodiment of the invention, the device consists of a basin 1 which may be constructed of usual laboratory material such as stainless steel, plastic, or the like; having rolled or blunt edges 2, and designed to contain the entire head of a patient. The receptacle is placed on an examining table, and the head of a patient is positioned on a headrest 3, mounted on a shaft 4 which fits into a tubular support 5, shown in FIG. 3, said support 5 being anchored to the bottom of the basin-receptacle. A set screw 6 on the support 5 permits the headrest to be raised and lowered to a desired height.

The receptacle may be equipped with a front section 7 extending outward an additional 1½ inches at the top and sloping inward toward the bottom at about a 40° angle. This section would serve as a neck rest for the patient.

The receptacle contains a false bottom 8. The false bottom slopes from side to center and from front to rear so that water will collect at the rear of the receptacle. A drain 9 may be located at the rear of the false bottom fitted with a rubber collar 10 and a plastic nozzle 11 having a bevelled edge to provide a leakproof fit in addition to easy insertion and removal. For most clinical purposes a rubber bulb 12 located on the plastic nozzle 11 will provide a convenient means of draining surplus water from the receptacle. When necessary, tubing may be attached to the drain 9 and extended from the drain to a large water basin placed under the examining table. When the ear or ears of a patient are irrigated the solution used will be discharged into the basin 1. It will flow toward the drain 9 along the false bottom 8. As the solution flows through the drain 9 it may be collected for analysis or discharged as waste. This receptacle provides a simple and stable means of positioning the head during irrigation and collecting the solution discharged from the ear or ears thereby eliminating the chance of spilling the solution due to startle effects on the patient, and eliminating the need to have an assistant position the patient's head or a collecting means thereunder.

I claim:
1. A caloric irrigation device comprising:
   (a) a receptacle having sides, a bottom, an open top and an outwardly curved lip on the uppermost edge of one side thereof;
   (b) a false bottom secured to the sides of said receptacle and spaced above the bottom of said receptacle;
   (c) said false bottom having a central opening and drainage means;
   (d) a vertically adjustable support projecting upwardly from the bottom of said receptacle and extending above said false bottom through said central opening, the minimum height of said vertically adjustable support being greater than the height of said lip above the bottom of said receptacle; and
   (e) an elongated rest carried by said vertically adjustable support having the longitudinal dimension thereof parallel to said lip on said one side of said receptacle.

2. A caloric irrigation device as claimed in claim 1 wherein said false bottom slopes downwardly from said lip toward the rear wall of said receptacle and downwardly from the side walls of said receptacle toward said central opening.

3. A caloric irrigation device as recited in claim 2 wherein said drainage means comprises a drainage connection to said false bottom at the lowermost portion thereof adjacent the rear wall of said receptacle and substantially centrally thereof and said drainage connection is adapted to be connected to a fluid collecting reservoir.

4. A caloric irrigation device as recited in claim 3 wherein said receptacle bottom is flat.

5. A caloric irrigation device as recited in claim 4 wherein said vertically adjustable support is located approximately centrally of the receptacle.

6. A caloric irrigation device as recited in claim 1 wherein said elongated rest has a curved contour lengthwise thereof.

References Cited

UNITED STATES PATENTS

| | | | |
|---|---|---|---|
| 1,323,466 | 12/1919 | Gottfried | 128—248 XR |
| 1,500,927 | 7/1924 | Davies et al. | 128—275 |
| 2,098,673 | 11/1937 | Pollock | 128—275 |
| 2,475,259 | 7/1949 | Singleton | 4—159 |
| 2,709,435 | 5/1955 | Kress | 128—260 |
| 3,026,537 | 3/1962 | Schnell | 4—159 |

RICHARD A. GAUDET, *Primary Examiner.*

R. L. FRINKS, *Assistant Examiner.*